| United States Patent [19] | [11] 3,923,601 |
| --- | --- |
| Treichler et al. | [45] Dec. 2, 1975 |

[54] PROCESS FOR THE MANUFACTURE OF CEPHALOSPHORIN C

[75] Inventors: Hans-Joerg Treichler, Buus; Jakob Nuesch, Riehen, both of Switzerland

[73] Assignee: Ciba-Geigy Corporation, Ardsley, N.Y.

[22] Filed: July 16, 1973

[21] Appl. No.: 379,531

Related U.S. Application Data

[62] Division of Ser. No. 106,420, Jan. 14, 1971, Pat. No. 3,776,815.

[52] U.S. Cl. ................................. 195/78; 195/53
[51] Int. Cl.$^2$ ........................................ C12K 1/02
[58] Field of Search ................ 195/36 R, 78, 79, 53

[56] References Cited

OTHER PUBLICATIONS

Stauffer et al., Develop. Ind. Microbiol., Vol. 7, pp. 104–113, (1966).

*Primary Examiner*—Alvin E. Tanenholtz
*Attorney, Agent, or Firm*—Joseph G. Kolodny; John J. Maitner; Theodore O. Groeger

[57] ABSTRACT

Process for the manufacture of Cephalosporin C by cultivating mutants of Emericellopsis-Cephalosporium in which the metabolism and/or biosynthesis of organic sulfur compounds is disturbed.

2 Claims, 1 Drawing Figure

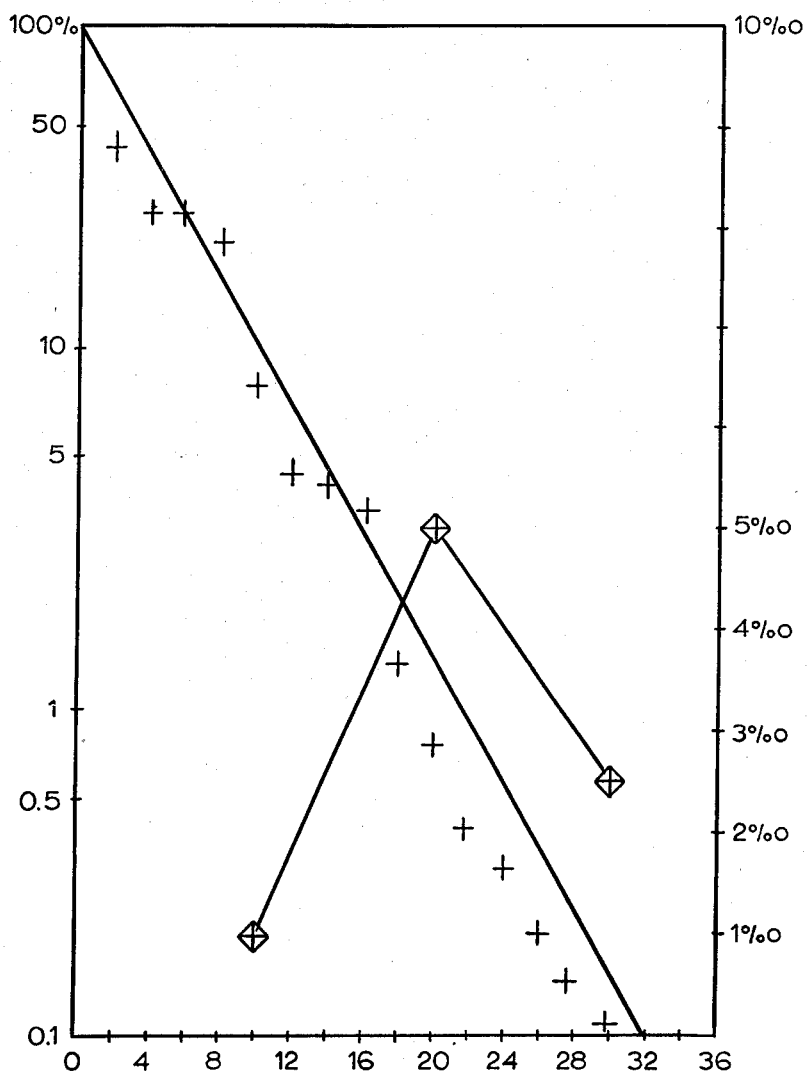

PROCESS FOR THE MANUFACTURE OF CEPHALOSPHORIN C

CROSS-REFERENCE TO RELATED APPLICATIONS

This is a division of application Ser. No. 106,420, filed Jan. 14, 1971, now U.S. Pat. No. 3,776,815.

The present invention relates to an improved process for the fermentative manufacture of Cephalosporin C. It is known that Cephalosporin C is obtained alongside further antibiotics (without Cephalosporin nucleus : Cephalosporin N, Cephalosporins P) by fermentation of fungi of the genera Emericellopsis-Cephalosporium such as the Brotzu strain I.M.I. 49137 (A.T.C.C. 11550) and mutants thereof, for example the Clevedon mutant 8650 (A.T.C.C.14533), compare, for example, U.S. Pat. Nos. 2,831,797 and 3,396,083. It is also known that the fermentative yield of Cephalosporin C is still unsatisfactory though extensive investigations with a view to increasing the production of Cephalosporin C have been carried out, compare E. van Heyningen "Cephalosporins" in Advances in Drug Research, Vol. 4, page 9 (Academic Press, London and New York, 1967). Thus it has for example been proposed to add a small amount (0.025 to 0.05 % by weight) of methionine to the nutrient medium when culturing Cephalosporium I.M.I. 49137, in order to increase the production of Cephalosporin N (see Miller et al., U.S. Pat. No. 2,831,797; Kavanagh et al., Arch. Biochem. Biophys. 77,268 (1958). Above this methionine concentration no further increase in yield was achieved. Demain and Newkirk (Appl. Microbiol. 10, 321 (1962)), Ott et al., (Appl. Microbiol. 10, 515 (1962)), Caltrider and Niss (Appl. Microbiol. 14, 746 (1966)) and others investigated the production of Cephalosporin C by the mutant 8650 on addition of D-methionine, D,L-methionine, L-methionine and various other sulphur-containing and non-sulphur-containing compounds, for example cysteine, cystine, S-ethyl-cysteine, homocysteine, homocystine, cystathionine, N-acetyl-methionine, α-methyl-methionine, ethionine, thioglycollic acid, taurine, 6-mercaptopurine or serine to the fermentation medium, but apart from methionine-sulphoxide and S-methyl-cysteine found no substance which had approximately the same production-increasing effect as methionine. For methionine itself (as for other active compounds) a maximum concentration was established, above which the Cephalosporin C production no longer increased but again decreased (according to Demain and Newkirk about 0.5 to 1 % by weight). As the maximum achievable increase in yield through the addition of methionine, an increase to about 4–7 times the yield of Cephalosporin C achieved without methionine is reached. This is however still unsatisfactory, especially also because the yield is subject to severe fluctuations and the maximum is frequently not reached when carrying out the fermentation on an industrial scale.

It has now surprisingly been found that the Cephalosporin production can be significantly improved if mutants in which the metabolism and/or the biosynthesis of organic sulphur compounds which are used for the synthesis of the Cephalosporin nucleus, especially methionine, is disturbed are cultured. In this way the yield obtainable with the addition of methionine can be further increased many-fold and additionally the severe fluctuations in yield can also be prevented. The subject of the invention is therefore a process for the fermentative manufacture of Cephalosporin C in a nutrient medium containing organic sulphur compounds, characterised in that mutants are cultured in which the metabolism and/or the biosynthesis of organic sulphur compounds is disturbed.

On the basis of experiments with radioactively marked compounds, for example $S^{35}$-methionine, $C^{14}$-serine and others it can be assumed that in the fermentation with strains of the genera Emericellopsis-Cephalosporium, for example the abovementioned strain 8650, the primary sulphur-yielding substance for the biosynthesis of the Cephalosporin C is methionine, and that this changes, through demethylation, into homocysteine, which is condensed with serine to give cystathionine; this is split into cysteine, α-ketobutyric acid and ammonia and the cysteine formed in this way is utilised for the synthesis of the Cephalosporin nucleus (compare Caltrider and Niss, l.c.). The sulphur-containing primary substance, methionine, can be synthesised by the strains mentioned using inorganic sulphur, and thus does not have to be present in the nutrient medium, neither do other organic sulphur compounds have to be present: the growth of the strains is independent of methionine or other organic sulphur compounds, and the strains are "prototrophic" with respect to these compounds.

In contrast thereto, the mutants according to the invention are dependent, for their growth, on organic sulphur-containing compounds, for example methionine (D,L; D or L) or its sulfoxide or sulfone, cysteine (D,L; D or L), cystine (D,L; D or L), homocysteine (D,L; D or L), homocystine (D,L; D or L), cystathionine, (all isomers, for example D,L-allo-cystathionine) and/or S-methyl-cysteine (D,L; D or L) being made available from outside, and are "auxotrophic" (growth-dependent) with regard to organic sulphur compounds. For simplicity we describe the mutants according to the invention as "methionine-auxotrophic" in the text which follows: this term also includes the auxotrophic nature with regard to organic sulphur compounds other than methionine.

In the case of the fermentation of the methionine-auxotrophic mutants the sulphur required for the growth and the Cephalosporin C production is added to the nutrient medium in the form of organic sulphur compounds, for example those mentioned above, or especially methionine. As regards the concentration of these compounds in the nutrient medium, it has been found that in contrast to the strains used hitherto, there is, in the new mutants, no upper concentration limit, on exceeding which the added organic sulphur compounds, for example methionine, exert an inhibiting effect on growth or Cephalosporin C production. These compounds can therefore be used in such high concentrations as are required by the increased growth and the increased production. The organic sulphur compounds are not a limiting factor of the nutrient medium.

Table 1 shows how the absence or presence of various methionine concentrations in a synthetic medium which contains no other organic sulphur compounds affect the growth of the basic strain 8650 and of the methionine-auxotrophic mutant 8650/A obtained therefrom.

The growth was determined in an agar diffusion test in which a solid minimal medium containing no organic sulphur compounds (nutrient medium II, see below)

and, by means of individual applied filter discs, the sulphur-containing solutions to be tested, are placed at the disposal of the fungus (auxanogram): 0.1 ml of mycelium suspension is spread on minimal agar in a Petri dish, incubation is carried out for 24 hours at 23°C, and filter discs (Whatman antibiotic discs 6mm $\phi$) which are impregnated with the test solution (0%, 1%, 2.5% or 5%) of methionine and then dried, are then laid on the plate. Incubation is then carried out for 7 days at 23°C. The basic strain grows well entirely without methionine; on addition of methionine below 1%, growth is increased; on further increasing the methionine concentration, a constantly increasing inhibition around the filter disc is found. Without the addition of methionine, the mutant does not grow at all; with increasing methionine concentration constantly increasing growth is found, without any inhibition.

Table 2 shows how the absence or the presence of various methionine concentrations in a synthetic nutrient medium, which does not contain any other organic sulphur compounds, affects the production of Cephalosporin C by the basic strain 8650 and the mutant 8650/A.

The strains were cultured for 7 days in the usual manner, with shaking, in Erlenmeyer flasks in the liquid synthetic base medium not containing any organic sulphur compounds (nutrient medium III, see below) or in synthetic base medium mixed with various concentrations of methionine (compare example 1), experiments a) to e)). After 96, 120, 144 and 168 hours samples were withdrawn in order to determine the Cephalosporin C yield. The maximum yields at methionine concentrations of 0%, 0.1%, 0.2%, 0.4% and 0.8% in the synthetic medium are given in the table. It will be seen that the basic strain shows good production even without methionine, and that the production reaches a maximum at 0.2 to 0.4% of methionine and then declines again, so that at 0.8% of methionine less than 70% of the maximum are produced. The mutant does not grow without methionine and therefore also does not produce. At low methionine concentration (0.1%) the production is already significantly higher than in the case of the basic strain in the same nutrient medium, and at a concentration of 0.8% of methionine 5 to 6 times the maximum produced with the basic strain is achieved.

The Cephalosporin C yield was determined in the agar diffusion test relative to the strain Alcaligenes Faecalis ATCC No. 8750 in accordance with the process described by Claridge and Johnson (2nd Interscience Conference on Antimicrobial Agents and Chemotherapy, Chicago, 1962). The test strain was further especially selected with a view to resistance towards Cephalosporin P and N. This makes its sensitivity towards Cephalosporin C so much greater that it is not necessary to remove the other antibiotics mentioned before measurement. In order to determine the Cephalosporin C content, samples of the fermentation broth are freed of the mycelium and so diluted with 0.1 molar phosphate buffer of pH 7 that the Cephalosporin C content of the solution is about 20–100 $\gamma$/ml.

A bioautogram with Neisseria catharalis (for example strain ETH 4163) is suitable for the qualitative detection of Cephalosporin C (alongside P and N) in the culture solution. The paper chromatogram is carried out on Whatman No. 1 paper in the system n-butanol-glacial acetic acid-water (11:3:11). The running time at 24°C is 8–10 hours. Appropriate Cephalosporin standard preparations are run at the same time for control purposes.

The culture of methionine-auxotrophic mutants is carried out in the customary manner for the culture of strains of the genera Emericellopsis-Cephalosporium, in shaking flasks or in the fermenters which are customary in the production of antibiotics.

The manufacture of the methionine-auxotrophic mutants takes place according to the methods known for obtaining mutants.

Thus rays such as X-rays or ultra-violet rays, or chemical agents, can be used for initiating the mutation. Known chemical mutagens are for example alkylating agents such as diethyl sulphate, ethyl methanesulphonate, ethyl ethanesulphonate, or analogues of nucleotide bases such as 5-bromuracil or 2-aminopurine, or compounds which chemically modify the nucleotide bases, such as hydroxylamine, nitrous acid or 1-methyl-3-nitro-1-nitroso-guanidine or compounds which effect an expulsion or an additional introduction of one or more nucleotide bases, for example acridines such as proflavine. The mutation-initiating rays or chemical agents are applied to conidia of the fungus strain in order to act. The time of action is so chosen that the number of mutants is as great as possible; during such a period of action most of the conidia (about 90–99 %) are killed. FIG. 1 shows the action of a mutagen, 1-methyl-3-nitro-1-nitrosoguanidine, on the abovementioned Cephalosporium strain 8650. The time of action (in minutes) is plotted on the abscissa, the number of surviving conidia in % (+) is plotted on the left ordinate and the number of the auxotrophic mutants in °/$_{oo}$ ⊕ is plotted on the right ordinate. It is seen that for a time of action of 20 minutes a maximum of mutations (5°/$_{oo}$) is achieved. The isolation of the mutants required for the process according to the invention is preferably carried out from samples with a maximum mutation rate. Appropriately, not the mutagenically treated conidia themselves, but the conidia of the daughter culture obtainable therefrom are employed.

In order to isolate the mutants, the following procedure can be adopted:

1. The sample of conidia containing auxotrophic mutants is sown on a solid "full medium," that is to say on a nutrient medium which also contains the organic sulphur compounds required for methionine-auxotrophic mutants. The viable unchanged and mutated conidia grow on the nutrient medium, for example an agar plate, and form (separate) colonies. Using the "rubber-stamp technique," an image of this plate is transferred to a "minimal medium," that is to say to a nutrient medium which does not contain the additional organic sulphur compounds required for methionine-auxotrophic mutants. The methionine-auxotrophic mutants do not grow on this minimal medium. By comparison with the full medium (master plate) the colonies of the methionine-auxotrophic mutants are recognisable and can be separated off.

Since various auxotrophic mutants can be formed by the mutations, and the desired methionine-auxotrophic mutants occur in very small numbers, an appropriate number of experiments with minimal media is required in order to isolate the desired mutants. On average, at most 1 to 2 of auxotrophic mutants are found per 10,000 surviving conidia.

2. In another process, the auxotrophic mutants are enriched at first by being separated from the surviving prototrophic organisms. For this purpose a mutagenically treated sample of conidia is exposed to conditions under which only the surviving prototrophic organisms, but not the auxotrophic mutants, grow; the growing organisms are then eliminated either mechanically or chemically.

a. As an example of mechanical elimination, the so-called concentration method according to N. Fries (Nature 159, 199 (1947) and the filtration enrichment technique of Woodward, De Zeuw and Srb, Proc. Nat. Acad. Sci. 40, 192 (1954) should be mentioned. It is based on the elimination of the prototrophic organisms, growing in a liquid minimal medium, by repeated filtration. In the liquid minimal medium, only the prototrophic organisms of the mutagenically treated sample of conidia germinate. On filtration through a sterile glass wool filter the conidia which have germinated and are provided with hyphens are retained on the filter, whilst the auxotrophic conidia pass into the filtrate. After repeating the germination and filtration several times, the auxotrophic conidia have been enriched in the filtrate. The filtrate is now distributed on solid minimal medium to which organic sulphur compounds (for example methionine) are added, in order to cause the methionine-auxotrophic mutants to grow. Apart from these, the prototrophic organisms which have not been eliminated by filtration grow on the nutrient medium. The desired mutants are separated off as described under (1). On average, one methionine-auxotrophic mutant is found per 10,000 to 100,000 growing conidia.

b. For the selective chemical destruction of growing prototrophic fungi, antifungal antibiotics which do not attack latent spores, or metabolism inhibitors, for example Amphothericin B or 2-desoxyglucose, can be employed.

3. A modification of method (2) is the so-called double mutant method (Mitchell, Proc. Nat. Acad. Sci. 36, 115 (1950); Lester and Gross, Science 129, 572 (1959)). It is based on the observation that there are single-auxotrophic mutants which on minimal medium still exert a certain metabolism and as a result die rapidly, whilst corresponding doubly-auxotrophic mutants, freshly induced by the mutagenic treatment are entirely inactive on the minimal medium and therefore remain viable. It is for example possible to treat conidia of an inositol-auxotrophic mutant of a Cephalosporium strain mutagenically and to sow them on an inositol-free minimal medium. On this medium the majority of the inositol-auxotrophic single mutants die, whilst the desired newly induced double mutants are not damaged. After a certain incubation time, during which experience shows that most of the single mutants have perished, the culture is placed on a layer of solution containing the requisite nutrients for the auxotrophic mutants, in order to cause the single and double mutants which are still viable to grow. The separation is for example effected in accordance with the process described under (1). On average, one methionine auxotrophic mutant is found per 3,000 to 20,000 growing conidia. If desired, methionine-auxotrophic single mutants formed from the double mutants by spontaneous reverse mutation can be isolated, for example by cultivation on an inositol-free methionine-containing minimal medium on which only the methionine-auxotrophic single mutants grow.

Using the methods described under (2) and (3), it is also possible to enrich and isolate auxotrophic mutants which have been produced spontaneously, that is to say without the use of mutagenic agents.

In order to detect the desired methionine-auxotrophic mutants amongst the various auxotrophic mutants, the auxanography described above is employed, by culturing the mutant on a solid minimal medium, whilst placing filter discs thereon which are impregnated with an organic sulphur compound necessary for the growth of this mutant. The desired mutants show growth around the filter disc.

The invention is described in the example which follows.

The following nutrient media are used:

Nutrient medium I (Nutrient solution NI 48)

| | | |
|---|---|---|
| Dry cornsteep | 23.5 | g |
| Sucrose | 20.0 | g |
| Ammonium acetate | 4.5 | g |
| Tap water | ad 1000 | ml |
| pH before sterilisation | 7.3 | |
| pH after sterilisation | 6.8 | – 7.0 |
| Sterilisation: | in an autoclave at 120°C, 1.2 atmospheres gauge, 20 minutes. | |

Nutrient medium II (Minimal agar)

| | | |
|---|---|---|
| Sucrose | 15 | g |
| Glucose | 2.5 | g |
| Sodium nitrate | 5.0 | g |
| $K_2HPO_4$ | 3 | g |
| $MgSO_4.7H_2O$ | 0.2 | g |
| $FeSO_4.7H_2O$ | 0.05 | g |
| KCl | 0.5 | g |
| Trace element solution [1] | 2 | ml |
| Bacto-agar | 25 | g |
| Distilled water | ad 1000 | ml |
| pH before sterilisation | 7.3 | |
| pH after sterilisation | 7.0 | |
| Sterilisation in an autoclave: | 20 minutes, 120°C, 1.2 atmospheres gauge. | |

[1] Trace element solution

| | |
|---|---|
| $FeSO_4.7H_2O$ | 1.0 g |
| $CuSO_4.5H_2O$ | 0.15 g |
| $ZnSO_4.7H_2O$ | 1.0 g |
| $MnSO_4.4H_2O$ | 0.1 g |
| $K_2MoO_4.2H_2O$ | 0.1 g |

Dissolve the individual components in a little distilled water and then make up to 1 litre.

Nutrient medium III (Synthetic base medium C 3)

| | | |
|---|---|---|
| $(NH_4)_2SO_4$ | 2.5 | g |
| $KNO_3$ | 5.0 | g |
| $MgSO_4.7H_2O$ | 0.2 | g |
| $KH_2PO_4$ | 0.2 | g |
| $CaCO_3$ | 5.0 | g |
| Trace element solution [1], see above | 10 | ml |
| Maltose | 40.0 | g |
| Methyl oleate | 7.0 | g |
| Meso-inositol | 2.0 | g |
| $H_2O$, distilled | ad 1000 | ml |
| pH before sterilisation | 7.3 | |
| pH after sterilisation | 7.0 ±0.2 | |
| Sterilisation: | in an autoclave, 20 minutes, 120°C, 1.2 atmospheres gauge. | |

Nutrient medium V (Complex full medium $C_1$)

| | | |
|---|---|---|
| a) Yeast extract | 4.0 | g |
| b) Glucose | 10.0 | g |
| b) NaCl | 1.0 | g |
| b) $FeSO_4.(7H_2O)$ | 0.1 | g |
| b) $MgSO_4.(7H_2O)$ | 0.1 | g |
| b) Methionine (DL) | 0.1 | g |
| b) Cysteine (DL) | 1.0 | g |
| b) Lysine (L) | 0.5 | g |
| b) α-Aminoadipic acid (dissolved in Na-bicarbonate) | 0.1 | g |
| b) Valine (DL) | 1.0 | g |
| b) Casaminoacids | 1.0 | g |
| a) Agar | 25.0 | g |
| Tap water | ad 1000 | ml | pH after sterilisation: 7.0 ;
make up a) with $H_2O$, distilled, to 800 ml,
make up b) with $H_2O$, distilled, to 200 ml,
sterilise a) for 20 minutes;

-continued

Nutrient medium III (Synthetic base medium C 3)

sterilise b) in G5-filter;
mix a) + b) in a water bath at 50°C.

Nutrient medium VI (Nutrient solution Nl 48 + S)

| | | |
|---|---|---|
| Dry cornsteep | 23.5 | g |
| Sucrose | 20.0 | g |
| Ammonium acetate | 4.5 | g |
| Casein hydrolysis product | 2 | g |
| Methionine (DL) | 1 | g |
| Cysteine (L) | 1 | g |
| Homocysteine (L) | 100 | mg |
| Cystathionine (L) | 100 | mg |
| Serine (L) | 100 | mg |
| Homoserine (L) | 100 | mg |
| Tap water ad 1 | ad 1000 | ml |
| pH before sterilisation | 7.3 | |
| Sterilisation: 120°C, 1.2 atmospheres gauge, 20 minutes. | | |

EXAMPLE

In a 500 ml Erlenmeyer flask with 4 flow breakers, containing 100 ml of nutrient medium I, this nutrient solution is inoculated with a spore suspension of mutant 8650/A and incubated for 48 hours on a rotating shaking machine at 250 rpm, amplitude 50 mm, at 23° C. 5 ml of this first preculture are then trans-inoculated into a second identical 500 ml Erlenmeyer flask with 100 ml of the identical nutrient solution and incubated for 48 hours as above. The main culture solutions, which are contained in 500 ml Erlenmeyer flasks with a flow breaker and 3-layer cotton wool closure are each inoculated with 5 ml of this second pre-culture. The main culture solutions consist of:
a. 80 ml of nutrient medium III (synthetic base medium C 3);
b. 80 ml of nutrient medium III with the addition of 1 g/litre of D,L-methionine;
c. 80 ml of nutrient medium III with the addition of 2 g/litre of D,L-methionine;
d. 80 ml of nutrient medium III with the addition of 4 g/litre of D,L-methionine;
e. 80 ml of nutrient medium III with the addition of 8 g/litre of D,L-methionine.

The incubation of the main culture is carried out on a rotating shaking machine at 250 rpm at 23° C for 7 days (168 hours). From the fourth day onwards samples are withdrawn daily for determination of the activity.

No growth can be detected in culture solution (a). Table 2, extreme right hand column, gives the maximum yields of Cephalosporin C in γ/ml for cultures (a) to (e) (average values from five experiments each).

The basic strain 8650 is cultured in the same manner as indicated for the methionine-auxotrophic mutant 8650/A. It grows well in the methionine-free culture solution (a).

Table 2 also gives the maximum yield of Cephalosporin C for cultures (a) to (e) (average values from five experiments each) for this strain.

Table 2 shows that the yield of Cephalosporin C is about 5 times greater for the methionine-auxotrophic mutant on addition of 4 g/l of methionine than for the basic strain on addition of the optimal amount of methionine (2 g/l).

The above mutant was manufactured as follows: a fresh suspension of conidia, containing $10^7$/ml, is used for the mutagenic treatment. This is obtained as follows:

A second pre-culture obtained as above is allowed to grow until conidia arise (between 72 and 120 hours depending on the strain), the culture liquor is then filtered through glass wool, whereby the mycelium is retained in the glass wool whilst the conidia pass into the filtrate, the filtrate is centrifuged and decanted, and the conidia sediment is suspended in 0.2 M phosphate buffer of pH 7.2. Centrifuging and suspending in phosphate buffer are repeated twice more. The conidia concentration in the resulting buffer solution is determined by means of a counting chamber and is adjusted to $10^7$/ml.

36 ml of the conidia suspension are mixed with 4 ml of a freshly prepared 1% strength (weight/volume) solution of 1-methyl-3-nitro-1-nitrosoguanidine in dimethylformamide-water (1:10). The treatment is carried out at 27° C. As FIG. 1 shows, the maximum mutation is reached after 20 minutes (105 mutants on 20,000 surviving conidia = 0.5 %).

For isolating the methionine-auxotrophic mutants, the daughter generation of the mutagenically treated conidia is used. 2 ml of the mutagenically treated sample of conidia which have been freed of the mutagen, washed and taken up in phosphate buffer, as above, are incubated in nutrient medium VI (nutrient solution Nl 48 + S) under the same conditions as described for the second preculture. When conidia have formed copiously (72 to 120 hours) the culture liquor is filtered through glass wool, the filtrate containing conidia is centrifuged and the conidia are taken up in phosphate buffer as described above, counted and, after suitable dilution, sown on a solid synthetic nutrient medium with addition of methionine, for example nutrient medium II with 0.5% D,L-methionine. The plates are incubated for 7 days at 25° C, in the course of which not more than 30–50 colonies should form per plate. An image of the plate is transferred by means of a stamp pad consisting of sandpaper onto the solid nutrient medium II without methionine. The full medium plate is stored at 4° C and the minimal agar plate is incubated for 7 days at 25°C. The two plates are then compared and the colonies which only grow on the full medium are isolated.

When isolating the mutants after prior enrichment by mechanical and chemical elimination of a considerable proportion of the prototrophic conidia which are still alive, the daughter generation of the mutagenically treated conidia is again used as the starting material. In the concentration method according to Fries the daughter conidia are repeatedly incubated in liquid minimal medium (nutrient medium II without agar) and a filtration through glass wool is carried out after each incubation. In the cell poison method and the double mutant method solid nutrient media (II) with minimal medium are used. The enriched conidia are sown onto the solid nutrient medium II with methionine in the same manner as described above for the non-enriched, and are replicated on minimal medium after formation of colonies, and treated further, as described above.

In the same manner as described above, mutant 8650/A can be cultivated in a nutrient medium which contains a natural nitrogen source, for instance fish meal, soya flour, peanut flour, or cornsteep instead of the synthetic nitrogen source. In this way, also an essentially higher production of Cephalosporin C is obtained with the mutant than with the original strain.

Table 1

| Nutrient medium II (minimal medium) D,L-methionine in % | 8650 | 8650/A |
| --- | --- | --- |
| — | strong growth | no growth |
| 1 | strong growth; slight inhibition around the filter disc. | moderate growth; no inhibition around the filter disc. |
| 2.5 | medium growth; pronounced inhibition ring around the filter disc. | medium growth; no inhibition ring around the filter disc. |
| 5 | medium growth; pronounced, large inhibition ring around the filter disc. | strong growth; no inhibition ring around the filter disc. |

Table 2

| | | D,L-methionine addition g/l | Maximal Cephalosporin C production in γ/ml | |
| --- | --- | --- | --- | --- |
| | | | 8650 | 8650/A |
| Synthetic base medium C 3 (nutrient medium III) | a) | — | 105 | —(no growth) |
| | b) | 1 | 131 | 245 |
| | c) | 2 | 141 | 487 |
| | d) | 4 | 123 | 750 |
| | e) | 8 | 91 | 760 |

We claim:
1. A colony of a methionine-auxotropic mutant of a Cephalosporin C-producing strain of the genera Emericellopsis-Cephalosporium.
2. A process for the manufacture of mutants of strains of the genera Emericellopsis-Cephalosporium that are especially suitable for the manufacture of Cephalosporin C, wherein strains of the genera Emericellopsis-Cephalosporium are mutated and from the mutants, there are selected the methionine-auxotropic mutants.

* * * * *